United States Patent
Yamamoto et al.

(10) Patent No.: US 8,701,837 B2
(45) Date of Patent: Apr. 22, 2014

(54) CHAIN-TYPE DRIVING FORCE TRANSMITTING APPARATUS

(75) Inventors: Osamu Yamamoto, Kariya (JP); Toru Inoue, Obu (JP); Shinji Kitaoka, Toukai (JP); Yukio Ueda, Toyoake (JP); Akifumi Kamitanigawa, Anjyo (JP); Satoshi Munakata, Nishikamo-gun (JP)

(73) Assignees: Aisin AI Co., Ltd, Nishio-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 1026 days.

(21) Appl. No.: 11/781,974

(22) Filed: Jul. 24, 2007

(65) Prior Publication Data
US 2008/0026893 A1 Jan. 31, 2008

(30) Foreign Application Priority Data
Jul. 27, 2006 (JP) .................................. 2006-205219

(51) Int. Cl.
| F01M 1/00 | (2006.01) |
| F01M 9/06 | (2006.01) |
| F16N 7/26 | (2006.01) |
| F16N 7/28 | (2006.01) |
| F01M 11/02 | (2006.01) |

(52) U.S. Cl.
USPC ........................................ 184/11.1; 184/11.2

(58) Field of Classification Search
USPC .................. 474/144, 91; 184/15.1, 11.1, 11.2
See application file for complete search history.

(56) References Cited

U.S. PATENT DOCUMENTS

| 606,543 | A | * | 6/1898 | Hanna | 184/11.1 |
| 1,099,916 | A | * | 6/1914 | Cushman | 184/11.2 |
| 1,161,724 | A | * | 11/1915 | Pierce | 184/11.1 |
| 1,418,892 | A | * | 6/1922 | Weiss et al. | 184/15.1 |
| 1,483,830 | A | * | 2/1924 | Moore | 184/11.1 |
| 1,525,994 | A | * | 2/1925 | Hyde | 184/15.1 |
| 1,565,103 | A | * | 12/1925 | Randles | 184/6 |
| 1,608,413 | A | * | 11/1926 | Mortensen | 184/11.1 |

(Continued)

FOREIGN PATENT DOCUMENTS

| JP | 04-181055 A | 6/1992 |
| JP | 2006-077894 A | 3/2006 |

OTHER PUBLICATIONS

Japanese Office Action issued in the corresponding Japanese patent application with partial English-language translation.

*Primary Examiner* — William A Rivera
*Assistant Examiner* — Henry Liu
(74) *Attorney, Agent, or Firm* — Buchanan Ingersoll & Rooney PC

(57) ABSTRACT

A chain-type driving force transmitting apparatus includes a case having a lower space accumulating therein lubricating oil, an input shaft rotatably supported by the case, an output shaft arranged in parallel with the input shaft and rotatably supported by the case, and a chain wound around the input shaft and the output shaft and lifting up the lubricating oil accumulated in the lower space of the case. The chain-type driving force transmitting apparatus further includes a separator positioned adjacent to the chain and dividing the lower space of the case into a first chamber housing the chain and a second chamber. The separator has an inclined portion formed at an upper end of the separator and inclining towards the chain so as to receive the lubricating oil lifted up by the chain, wherein the lubricating oil received by the inclined portion flows into the second chamber.

8 Claims, 4 Drawing Sheets

(56) References Cited

U.S. PATENT DOCUMENTS

| | | | | |
|---|---|---|---|---|
| 1,670,471 A * | 5/1928 | Merkt | | 184/13.1 |
| 1,682,829 A * | 9/1928 | Bremer | | 184/15.1 |
| 1,717,365 A * | 6/1929 | Bremer | | 184/15.1 |
| 1,771,346 A * | 7/1930 | Perry | | 184/15.1 |
| 1,771,835 A * | 7/1930 | Bartlett | | 184/15.1 |
| 1,783,978 A * | 12/1930 | Perry | | 184/15.1 |
| 1,868,198 A * | 7/1932 | Dow | | 184/15.1 |
| 1,960,693 A * | 5/1934 | Bryant | | 184/15.1 |
| 1,971,781 A * | 8/1934 | Henderson et al. | | 184/11.1 |
| 1,984,148 A * | 12/1934 | Morrish et al. | | 184/15.1 |
| 1,998,682 A * | 4/1935 | McCann | | 184/15.1 |
| 2,491,747 A * | 12/1949 | Maier | | 184/6.18 |
| 3,012,632 A * | 12/1961 | Bradley | | 184/15.1 |
| 3,463,267 A * | 8/1969 | Gudmundsen et al. | | 184/109 |
| 3,529,698 A * | 9/1970 | Nelson | | 184/6.12 |
| 3,625,310 A * | 12/1971 | Herrick | | 184/6.12 |
| 3,724,582 A * | 4/1973 | Wood | | 180/219 |
| 4,630,711 A * | 12/1986 | Levrai et al. | | 184/6.12 |
| 4,671,782 A * | 6/1987 | Ochiai et al. | | 474/93 |
| 4,721,184 A * | 1/1988 | Sowards | | 184/6.12 |
| 5,033,989 A * | 7/1991 | Shimaguchi | | 474/8 |
| 5,041,062 A * | 8/1991 | Dornhoff | | 474/144 |
| 2006/0048600 A1 | 3/2006 | Taguchi et al. | | |

\* cited by examiner

CHAIN-TYPE DRIVING FORCE TRANSMITTING APPARATUS

FIELD OF THE INVENTION

The present invention relates to a chain-type driving force transmitting apparatus, which is inputted with an outside driving force and outputs the driving force via a chain to an outside.

BACKGROUND

Chains have been conventionally used to transmit rotation among plural shafts. For example, a chain is wound around an input shaft inputted with driving force from an engine and an output shaft transmitted with driving force distributed from the input shaft in accordance with a driving condition of a vehicle. Generally, lubricating oil is used to components such as the chain, the input shaft and output shaft, in order to reduce abrasion or heating-up caused by friction between such components. However, it is difficult to supply lubricating oil all over the components to be lubricated. Further, the lubricating oil may be occasionally supplied to each component at an amount exceeding an adequate amount, which is not preferable.

As one of the examples, a transfer to distribute driving force of an input shaft to output shafts in relation to front wheels and rear wheels, is mounted to a four-wheel drive car (4WD). The transfer is provided with a case in which lubricating oil is accumulated so as to protect a chain, the input shaft, the output shafts and so on, from being worn out or from heating up due to rotations thereof. The lubricating oil is accumulated at a lower space of the case, and a lower portion of the chain is soaked thereinto. The chain lifts the lubricating oil upwards when rotating, and as a consequence, the chain, the input and the output shafts wound around by the chain, and so on are lubricated. The lower space of the case is divided into two chambers from the bottom portion of the case to the intermediate portion thereof by a plate member (separator). The separator is arranged so as to be in parallel with a plane of the rotation of the chain. One of the chambers of the lower space includes a chain and the other chamber includes a strainer having an inlet communicating with a pump adapted to suck up lubricating oil. The strainer filters out the lubricating oil so as to separate scraps such as scrap metals from the lubricating oil. The lubricating oil is circulated by the pump through the strainer and lubricates each component that is not lubricated by the lubricating oil lifted by the chain. The separator divides the lower space of the case into the two chambers (chain-side chamber and strainer-side chamber) so that each chamber could store therein a different amount of lubricating oil, i.e., each chamber could have a different lubricating oil surface level. When the lubricating oil surface level of the chain-side chamber is appropriate, the chain is soaked in the lubricating oil. When the amount of lubricating oil in the chain-side chamber is large and the lubricating oil surface level of the chain-side lubricating oil is too high, resistance (stirring resistance) relative to the rotation of the chain is increased and the transmitting efficiency of the rotation is reduced. Meanwhile, it is necessary to keep a lubricating oil surface level, or an amount of lubricating oil, of the strainer-side portion at an appropriate degree at which the inlet of the strainer related to sucking up the lubricating oil is sufficiently soaked in the lubricating oil. Should the lubricating oil surface level of the strainer-side portion be low, the inlet thereof may be easily exposed out of the lubricating oil. In such circumstances, the pump may suck up the air as well as the lubricating oil.

The present invention has been made in view of the above circumstances and provides a chain-type driving force transmitting apparatus which adjusts amounts of lubricating oil in two chambers of a lower space of a case thereof.

SUMMARY OF THE INVENTION

According to an aspect of the present invention, a chain-type driving force transmitting apparatus includes a case having a lower space accumulating lubricating oil therein, an input shaft which is rotatably supported by the case, an output shaft which is arranged in parallel with the input shaft and rotatably supported by the case, and a chain which is wound around the input shaft and the output shaft and which is configured to transmit driving force inputted from the input shaft to the output shaft and to lift up the lubricating oil accumulated in the lower space of the case. The chain-type driving force apparatus further includes a separator which is positioned adjacent to the chain and divides the lower space of the case into a first chamber housing the chain and a second chamber. The separator includes an inclined portion which is formed at an upper end of the separator and inclines towards the chain so as to receive the lubricating oil lifted up by the chain, and the lubricating oil received by the inclined portion flows into the second chamber.

BRIEF DESCRIPTION OF THE DRAWINGS

The foregoing and additional features and characteristics of the present invention will become more apparent from the following description considered with reference to the accompanying drawings, wherein.

DETAILED DESCRIPTION

Embodiments of the present invention will be explained in accordance with the attached drawings. Chain-type driving force transmitting apparatuses of the embodiments are applicable as a transfer for a four-wheel drive (4WD) vehicle.

Figure 1:
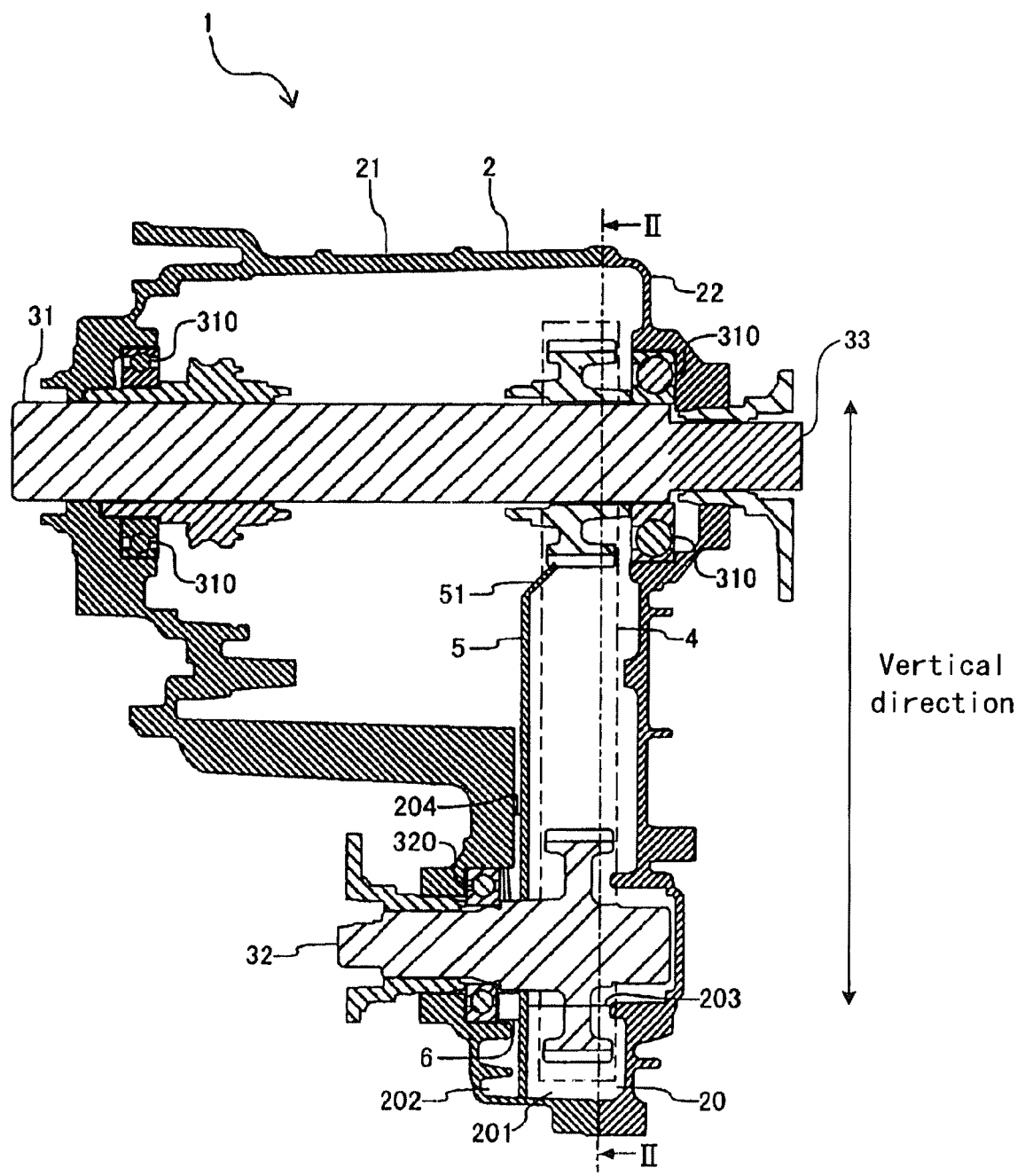
FIG. 1 illustrates a cross-sectional view of a chain-type driving force transmitting apparatus according to a first embodiment.

FIG. 1 illustrates a cross-sectional view of a chain-type driving force transmitting apparatus 1 according to the first embodiment of the present invention.

The chain-type driving force transmitting apparatus 1 is provided with a case 2 which has a lower space 20 at which lubricating oil is accumulated, an input shaft 31 rotatably supported by the case 2, an output shaft 32 rotatably supported by the case 2 and arranged in parallel with the input shaft 31, an output shaft 33 rotatably supported by the case 2 and arranged in coaxial with the input shaft 31, and a chain 4 wound around the input shaft 31 and the output shaft 32. The chain 4 is configured to transmit driving force of the input shaft 31 to the output shaft 32 and to lift up lubricating oil from the lower space 20. The chain-type driving force transmitting apparatus 1 is further provided with a separator 5 which is positioned adjacent to or at the side of the chain 4 and divides the lower space 20 of the case 2 into two chambers.

The case 2 is formed by mating or jointing a front case 21 with a rear case 22. In the same manner, the lower space 20, which is arranged in the lower portion of the case 2 and in which lubricating oil is accumulated, is formed by mating or jointing the front case 21 with the rear case 22.

The input shaft 31 is supported by the case 2 at the upper portion thereof via bearings 310 so that the input shaft 31 is arranged to be parallel with the output shaft 32. The output shaft 32 is supported by the case 2 at the lower portion thereof via a bearing 320.

Figure 2:
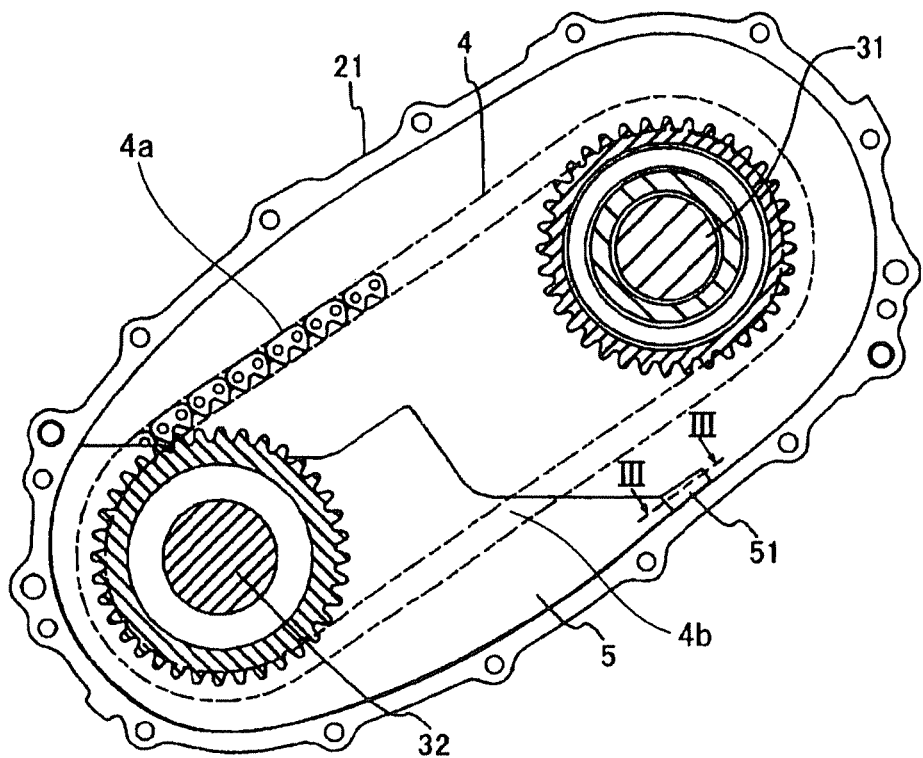
FIG. 2 illustrates a cross-sectional view of the chain-type driving force transmitting apparatus taken along line II-II.

A two-dot line exhibits the chain 4 in FIG. 1. With reference to FIG. 2, the chain 4 includes a first chain portion 4a and a second chain portion 4b. The chain 4 rotates about the input shaft 31 and the output shaft 32 in a manner that the first chain portion 4a and the second chain portion 4b are arranged in parallel with each other. Further, the chain 4 is supported at the position, where the front case 21 and the rear case 22 are coupled together, and extends in the vertical direction. The axis of the chain 4 is arranged in parallel to the input shaft 31, the output shafts 32 and 33, and the chain 4 is wound around the input shaft 31 and the output shaft 32 so as to transmit the driving force of the input shaft 31 to the output shaft 32.

The separator 5 extends from the bottom portion of the case 2 to the intermediate portion or area of the case 2, so as to divide the lower space 20 of the case 2 into a chain-side chamber 201 (serving as a first chamber), in which the chain 4 is housed, and a strainer-side chamber 202 (serving as a second chamber), in which a strainer 6 is housed. The strainer 6 collects scraps contained in lubricating oil accumulated in the lower space 20. The separator 5 is arranged perpendicular to an axial direction of the input shaft 31, the output shaft 32. The upper end of the separator 5 includes an inclined portion 51, which is bent toward the chain 4. More specifically, the upper end of the separator 5 is partially bent at a predetermined angle to form edge portion of the inclined portion 51 to be integral with the separator 5. Although an opening end of the inclined portion 51 is located close to the chain 4, the opening end is not in contact with the chain 4 in order not to interfere the rotational movement thereof. Further, it is preferable that the predetermined angle is assigned greater than zero degree and less than 90 degrees from the extending plane of the separator 5 towards the chain 4.

Figure 3:
FIG. 3 illustrates a cross sectional view of a separator taken along line III-III.

FIG. 2 illustrates a cross-sectional view of the chain-type driving force transmitting apparatus 1 taken along line II-II, having the rear case 22 removed. According to the first embodiment, the inclined portion 51 of the separator 5 is not formed at an entire area of an edge portion of the separator 5 but at a partial area of the edge portion of the separator 5. The partial area of the edge portion of the separator 5 is located between the front case 21 and the outer periphery of the chain 4 and is inclined towards the rear case 22. FIG. 3 illustrates a cross-sectional view of the inclined portion 51 of the separator 5, taken along line III-III in FIG. 2.

In the case 2 of the chain-type driving force transmitting apparatus 1, according to the first embodiment, lubricating oil is accumulated so as to lubricate the input shaft 31, the output shafts 32 and 33, the chain 4, and so on. Lubricating oil is accumulated in the chain-side chamber 201 and in the strainer-side chamber 202. The driving force inputted to the input shaft 31 is transmitted to the output shaft 32 via the chain 4. The chain 4 is soaked in lubricating oil accumulated in the chain-side chamber 201 while rotating. Accordingly, the chain 4 is lubricated. Further, because the output shaft 32 is located at the lower portion of the case 2, the output shaft 32 is lubricated by the lubricating oil. Meanwhile, components located at upper portion or area of the case 2, such as the input shaft 32, are lubricated by lubricating oil which is sucked up from the lower space 20 by a pump (not illustrated). More specifically, the lubricating oil accumulated in the strainer-side chamber 202 is sucked up by the pump (not illustrated) through the strainer 6 housed in the strainer-side chamber 202. The strainer 6 has an inlet through which the pump sucks up lubricating oil, and serves as a filter to separate scraps such as scrap metal from lubricating oil.

According to the first embodiment of the present invention, the lubricating oil lifted up by the chain 4 partially falls on the inclined portion 51 of the separator 5 and flows into the strainer-side chamber 202 in favor of gravity. Meanwhile, the lubricating oil lifted up by the chain 4 is partially dispersed or scattered away because of the rotating force of the chain 4. As described above, the separator 5 is formed with the inclined portion 51. Therefore, lubricating oil, which does not fall directly downward on the chain 4, is received by the inclined portion 51 and is accumulated in the strainer-side chamber 202. As a result, the amount of the lubricating oil in the strainer-side chamber 202 is increased. Consequently, it is possible to reduce the amount of lubricating oil accumulated in the chain-side chamber 201 and to lower a lubricating oil height level 203 of the chain-side chamber 201 and moreover, it is also possible to increase the amount of lubricating oil accumulated in the strainer-side chamber 202 and to raise a lubricating oil height level 204 of the strainer-side chamber 202. When the amount of lubricating oil in the chain-side chamber 201 is excessive and the lubricating oil height level 203 is high, the portion or area of the chain 4 soaked in lubricating oil is increased. In such circumstances, an excessive load may be applied to the chain 4 when rotating. However, by providing the inclined portion 51 of the separator 5, it is possible to adjust the amount of lubricating oil accumulated in the chain-side chamber 201 to an adequate amount. Meanwhile, when the amount of lubricating oil in the strainer-side chamber 202 is too small and the height of the strainer-side lubricating oil surface 204 is low, the pump results in intaking the air with lubricating oil through the strainer 6 and the lubricating efficiency of components such as gears (not illustrated) housed in the case 2 decreases. However, by providing the inclined portion 51, the lubrication oil lifted by the chain 4 falls on the inclined portion 51 and flows into the strainer-side chamber 202. Therefore, it is possible to assure the sufficient amount of lubricating oil to the strainer-side chamber 202. It is further possible to reduce the stirring resistance of the chain 4 and to prevent the pump from sucking the air through the strainer 6. Additionally, although the separator 5 is made of a flat plate and easily takes the impact of the splash of the lubricating oil lifted by the chain 4, it is possible to increase the strength of the separator 5 by providing the inclined portion 51 because a section modulus is increased.

Figure 4:
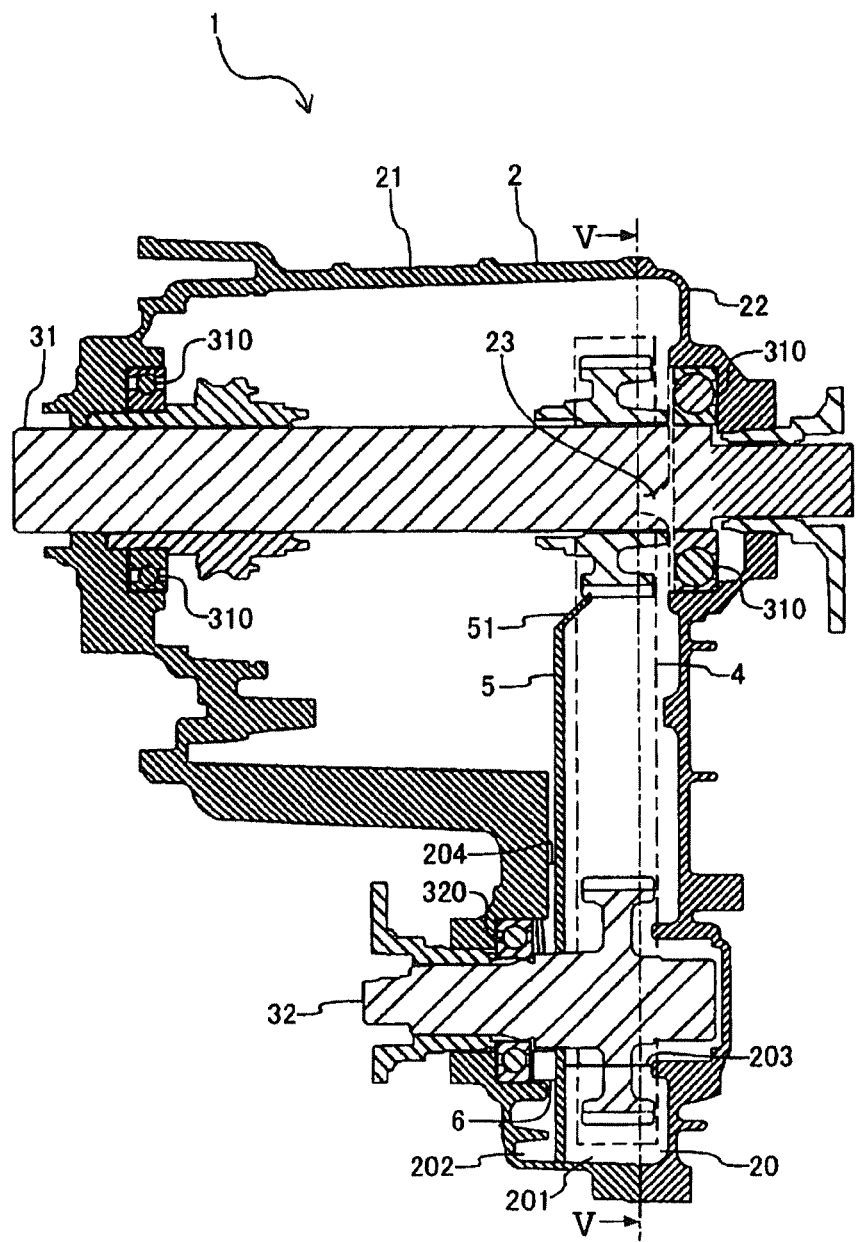
FIG. 4 illustrates a cross-sectional view of a chain-type driving force transmitting apparatus according to a second embodiment.
Figure 5:
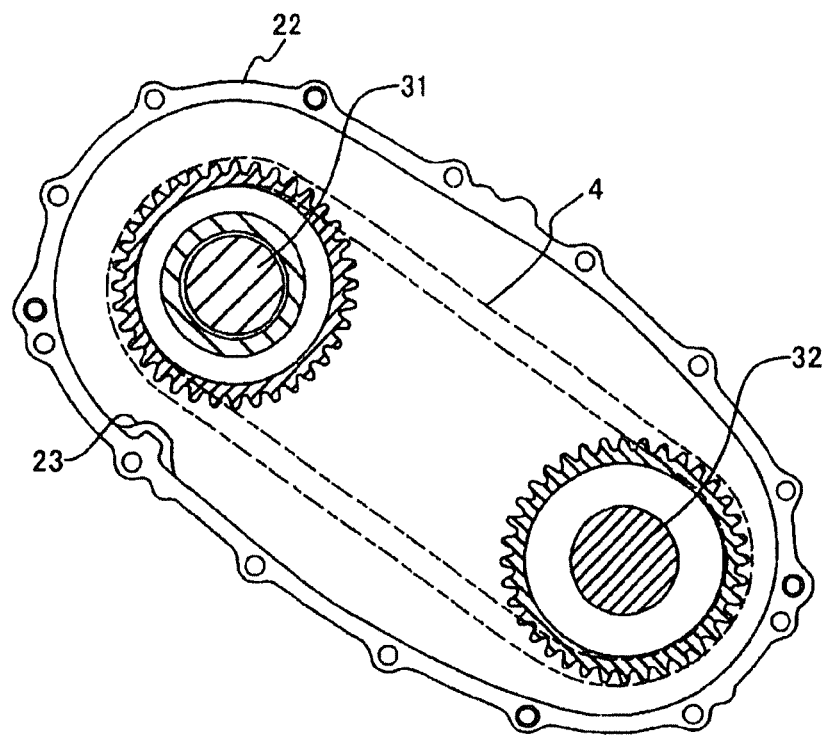
FIG. 5 illustrates a cross sectional view of the chain-type driving force transmitting apparatus taken along line V-V.

A second embodiment of the present invention will be described hereinbelow with reference to FIGS. 4 and 5. In the second embodiment of the present invention, the inner configuration of the case 2 is partly different from the one of the first embodiment, and the other components herein are used in the same manner as the chain-type driving force transmitting apparatus 1 according to the first embodiment. Accordingly, description of the same components and the same functions will be omitted herein. FIG. 4 illustrates the cross-sectional view of the chain-type driving force transmitting apparatus 1 according to the second embodiment of the present invention, while FIG. 5 illustrates the cross sectional view of the chain-type driving force transmitting apparatus 1 taken along line V-V in FIG. 4.

The case 2 includes a protrusion 23 in the vicinity of the separator 5 and at an upper portion or area than the separator 5. The protrusion 23 is formed or provided at the rear case 22 facing the outer periphery of the chain 4 and arranged in parallel with the rotating direction of the chain 4, and protrudes towards the chain 4 so as not to be in contact therewith. The protrusion 23 is positioned higher than the line extending from the inclined portion of the separator 5 towards the chain 4, and the upper surface of the protrusion 23 is inclined at a certain angle towards the inclined portion 51 of the separator 5.

According to the second embodiment of the chain-type driving force transmitting apparatus 1, the lubricating oil, accumulated in the chain-side chamber 201 and lifted up by the chain 4, partially falls down and impacts the protrusion 23. The lubricating oil, which impacts the protrusion 23, is dispersed or scattered and reaches the inclined portion 51. That is, the inclined portion 51 of the separator 5 receives not only a part of the lubricating oil, which is lifted up by the chain 4 and falls down, but also the lubricating oil, which impacts with the protrusion 23 and disperses to the inclined portion 51. Those lubricating oil then fall down into the strainer-side chamber 202. Accordingly, it is possible to adjust the amount of lubricating oil accumulated in the chain-side chamber 201 to the adequate amount and to increase the amount of lubricating oil accumulated in the strainer-side chamber 202. As a result, it is possible to reduce the stirring resistance of the chain 4 and to prevent the pump from intaking the air.

As one of the examples, it is further possible to form or provide the inclined portion 51 of the separator 5 entirely at the upper portion of the separator 5. Additionally, it is still further possible to form or provide multiple inclined portions 51 at the upper portion of the separator 5 placing adequate spaces between each inclined portions 51. Consequently, the lubricating oil in the strainer-side chamber 202 is accumulated efficiently and the strength of the separator 5 may be increased. Additionally, it is also possible to form or provide the protrusion 23 at the front case 21, or at both the front case 21 and the rear case 22, as long as the protrusion 23 is formed or provided at a higher position than the separator 5 in the case 2 and at which the lubricating oil of the protrusion 23 disperses onto the inclined portion 51. It is further possible to form or provide a plurality of protrusions 23 in the same manner as described above. The configuration of the protrusion 23 is not limited, as long as the upper surface thereof inclines to the inclined portion 51 at a certain angle.

In the chain-type driving force transmitting apparatus as described above, the inclined portion inclines at a predetermined length and a predetermined angle so as not to contact with the chain. When the lubricating oil lifted up by the chain falls in favor of gravity, the lubricating oil is partially received by the inclined portion and falls into the second chamber of the case because of the inclination of the separator or the inclined portion. The rest of the lubricating oil, which does not fall into the second chamber, falls into the first chamber housing therein the chain. Therefore, it is possible to increase and decrease the amount of lubricating oil accumulated in both the first chamber and the second chamber to an adequate amount.

It is preferable that at least one protrusion, which protrudes towards the inclined portion of the separator, is provided inside the case. It is further preferable that the protrusion is arranged in the vicinity of the separator and higher than the inclined portion of the separator so that the lubricating oil lifted up by the chain impacts the protrusion and is dispersed or splashes into the second chamber. The protrusion receives the lubricating oil, which is lifted up by the chain and falls downward, and disperses or scatters away the lubricating oil to an area that deviates from the downward area on the chain. Further, by forming or providing the protrusion higher than the inclined portion of the separator, it is possible for the inclined portion of the separator to receive the lubricating oil, which impacts with the protrusion and disperses away, and to introduce the lubricating oil to the second chamber of the lower space of the case. Accordingly, it is possible to increase the amount of lubricating oil introduced into the second chamber.

According to the chain-type driving force transmitting apparatus as described above, lubricating oil lifted up by the chain falls directly downward on the chain and partially falls on the inclined portion. The lubricating oil, which falls on the inclined portion, flows into the second chamber of the lower space which is divided into two chamber. Accordingly, it is possible to reduce the amount of lubricating oil accumulated in the first chamber and to increase the amount of lubricating oil in the second chamber.

Further, lubricating oil lifted up by the chain falls down in favor of gravity and impacts the protrusion formed inside of the case. Because the protrusion is arranged in the vicinity of the inclined portion of the separator and higher than the inclined portion, the lubricating oil is partially dispersed or scattered and reaches to the inclined portion. That is, the lubricating oil, which is lifted up by the chain and falls down in favor of gravity, partially reaches the inclined portion directly or reaches thereto after impacting the protrusion, and the rest of the lubricating oil falls directly downward on the chain. As a result, it is possible to further increase the amount of lubricating oil accumulated in the second chamber because of the inclined portion.

The principles, preferred embodiments and mode of operation of the present invention have been described in the forgoing specification. However, the invention which is intended to be protected is not to be construed as limited to the particular embodiments disclosed. Further, the embodiments described hereinbelow are to be regarded as illustrative rather than restrictive. Variations and changes may be made by others, and equivalents employed, without departing from the sprit of the present invention. Accordingly, it is expressly intended that all such variations, changes and equivalents which wall within the spirit and scope of the present invention as defined in the claims, be embraced thereby.

The invention claimed is:

1. A chain-type driving force transmitting apparatus comprising:
   a case formed by joining a front case and a rear case to thereby form a lower space accumulating therein lubricating oil;
   an input shaft rotatably supported by the case;
   an output shaft arranged in parallel with the input shaft and rotatably supported by the case;
   a chain wound around the input shaft and the output shaft, the chain configured to transmit driving force inputted from the input shaft to the output shaft and to lift up the lubricating oil accumulated in the lower space of the case;
   a separator positioned adjacent to the chain and extending perpendicularly to an axial direction of the input and output shafts, the separator being positioned in the front case and extending from a bottom surface of the case to a level higher than the output shaft to thereby be positioned over the output shaft such that a top end surface of the separator is positioned at a level lower than the input shaft, whereby the lower space of the case is divided in a transverse direction thereof into a first chamber in which the chain is provided and a second chamber; and an inclined portion provided at an upper end of the separator and inclining toward the chain so as to receive the lubricating oil lifted up by the chain, wherein the lubricating oil received by an upwardly facing surface of the inclined portion flows into the second chamber; and wherein the second chamber houses a strainer which collects the lubricating oil accumulated in the lower space.

2. A chain-type driving force transmitting apparatus according to claim 1, further comprising:

a protrusion provided at an inside wall of the case and protruding inwardly towards the inclined portion of the separator, the protrusion being arranged in the vicinity of the separator and higher than the inclined portion of the separator, wherein the lubricating oil lifted up by the chain impacts on the protrusion and splashes, whereby the protrusion guides the lubricating oil into the second chamber in cooperation with the inclined portion of the separator.

3. A chain-type driving force transmitting apparatus according to claim 2, wherein the protrusion includes an upper surface sloped downwardly towards the inclined portion to guide the lubricating oil into the second chamber in cooperation with the inclined portion of the separator.

4. A chain-type driving force transmitting apparatus comprising:

a case formed by joininq a front case and a rear case to thereby form a lower space accumulating therein lubricating oil;

an input shaft rotatably supported by the case;

an output shaft arranged in parallel with the input shaft and rotatably supported by the case;

a chain wound around the input shaft and the output shaft, the chain configured to transmit driving force inputted from the input shaft to the output shaft and to lift up the lubricating oil accumulated in the lower space of the case;

a separator positioned adjacent to the chain and extending perpendicularly to an axial direction of the input and output shafts, the separator being positioned in the front case and extending from a bottom surface of the case to a level higher than the output shaft to thereby be positioned over the output shaft such that a top end surface of the separator is positioned at a level lower than the input shaft, whereby the lower space of the case is divided in a transverse direction thereof into a first chamber in which the chain is provided and a second chamber; and an inclined portion provided at an upper end of the separator and at least partially facing a circumferential portion of the chain so as to receive the lubricating oil lifted up by the chain, wherein an end portion of the inclined portion is positioned within a width range of the chain, and wherein the lubricating oil received by an upwardly facing surface of the inclined portion flows into the second chamber; and wherein the second chamber houses a strainer which collects the lubricating oil accumulated in the lower space.

5. A chain-type driving force transmitting apparatus according to claim 4, further comprising:

a protrusion provided at an inside wall of the case and protruding inwardly towards the inclined portion of the separator, the protrusion at least partially facing a circumferential portion of the chain, wherein the lubricating oil lifted up by the chain impacts on the protrusion and splashes, whereby the protrusion guides the lubricating oil into the second chamber in cooperation with the inclined portion of the separator.

6. A chain-type driving force transmitting apparatus comprising:

a case formed by joininq a front case and a rear case to thereby form a lower space accumulating therein lubricating oil;

an input shaft rotatably supported by the case;

an output shaft arranged in parallel with the input shaft and rotatably supported by the case;

a chain wound around the input shaft and the output shaft, the chain configured to transmit driving force inputted from the input shaft to the output shaft and to lift up the lubricating oil accumulated in the lower space of the case;

a separator positioned adjacent to the chain and extending perpendicularly to an axial direction of the input and output shafts, the separator being positioned in the front case and extending from a bottom surface of the case to a level higher than the output shaft to thereby be positioned over the output shaft such that a top end surface of the separator is positioned at a level lower than the input shaft, whereby the lower space of the case is completely separated into a first chamber in which the chain is provided and a second chamber; and an inclined portion provided at an upper end of the separator and inclining toward the chain so as to receive the lubricating oil lifted up by the chain, wherein the lubricating oil received by an upwardly facing surface of the inclined portion flows into the second chamber; and wherein the second chamber houses a strainer which collects the lubricating oil accumulated in the lower space.

7. A chain-type driving force transmitting apparatus according to claim 2, wherein the protrusion is formed at the rear case and the separator is provided at the front case.

8. A chain-type driving force transmitting apparatus according to claim 2, wherein the protrusion and the inclined portion are positioned so as not to overlap with each other in an axial direction of the input shaft.

* * * * *